United States Patent

[11] 3,562,633

| [72] | Inventor | William H. Swain |
| | | Sarasota, Fla. |
| [21] | Appl. No. | 677,126 |
| [22] | Filed | Oct. 23, 1967 |
| [45] | Patented | Feb. 9, 1971 |
| [73] | Assignees | William H. Swain Company |
| | | Sarasota, Fla. |
| | | fractional part interest to each; |
| | | William J. Kreske |
| | | Newton Centre, Mass., fractional part interest to each |

[54] TRANSMITTER AND RECEIVER ELECTRODE METHOD AND APPARATUS FOR SENSING PRESENCE AND PROXIMITY OF UNDERWATER OBSTRUCTIONS
50 Claims, 14 Drawing Figs.

[52] U.S. Cl. ............................................. 324/1, 324/3, 324/9
[51] Int. Cl. .............................................. G01v 3/02
[50] Field of Search ........................... 324/1, 3, 9, 10, 64

[56] References Cited
UNITED STATES PATENTS

| 1,897,688 | 2/1933 | Ambronn | 324/1 |
| 1,951,387 | 3/1934 | Zuschlag | 324/1 |
| 2,531,088 | 11/1950 | Thompson | 324/1 |
| 2,599,413 | 6/1952 | Reichertz | 324/1X |
| 2,712,630 | 7/1955 | Doll | 324/10X |
| 2,880,389 | 3/1959 | Ferre et al. | 324/1 |
| 2,922,101 | 1/1960 | Mayes | 324/1 |
| 3,182,250 | 5/1965 | Mayes | 324/9X |
| 3,214,728 | 10/1965 | Higgins | 324/3X |
| 3,329,929 | 7/1967 | Burnett | 324/3X |
| 3,405,356 | 10/1968 | Hubby | 324/64X |

FOREIGN PATENTS

| 560,860 | 10/1932 | Germany | 324/9 |
| 188,676 | 12/1922 | Great Britain | 324/3 |
| 889,356 | 2/1962 | Great Britain | 324/3 |

*Primary Examiner*—Gerard R. Strecker
*Attorney*—Walter J. Kreske

ABSTRACT: An electric oscillator is coupled to apply an alternating potential across a pair of transmitter electrodes protruding into water under a boat or other vessel, at least one receiver electrode protruding into the water is coupled to an amplifier, the output of which is coupled to an electric meter to indicate changes in potential of the receiver electrode with respect to a reference potential as an indication of obstruction changes surrounding the vessel, the particular obstruction indicated being determined by the arrangement of the receiver electrode with respect to the transmitter electrodes.

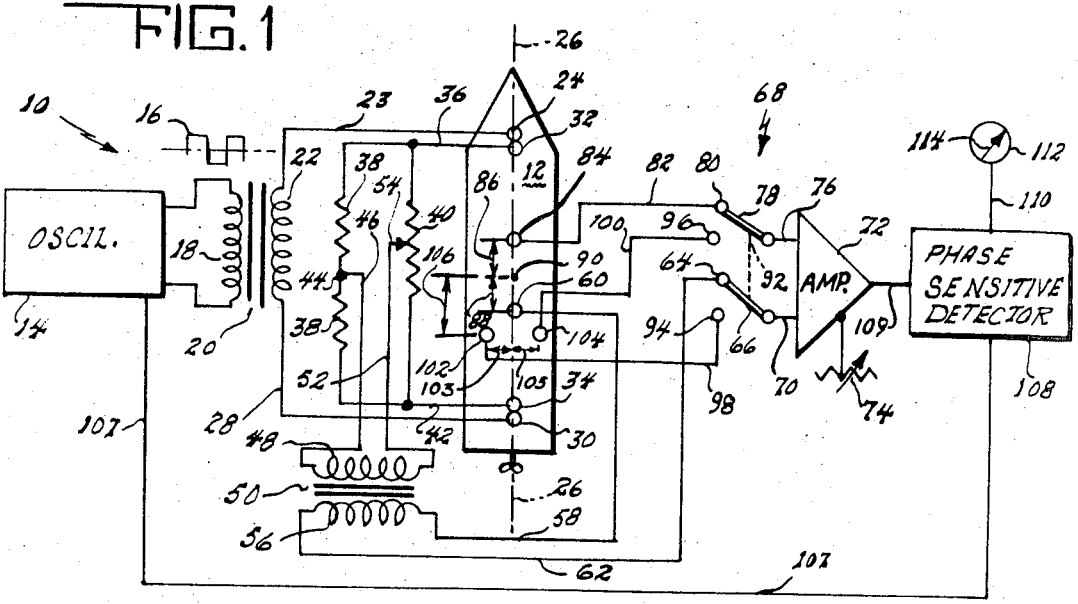
FIG. 1
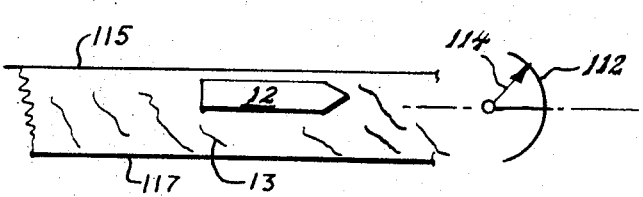
FIG. 3
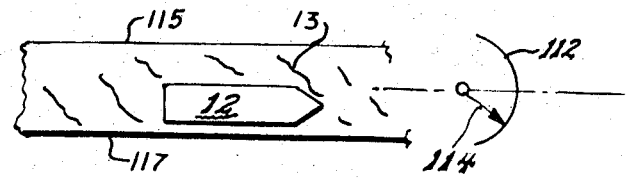
FIG. 4
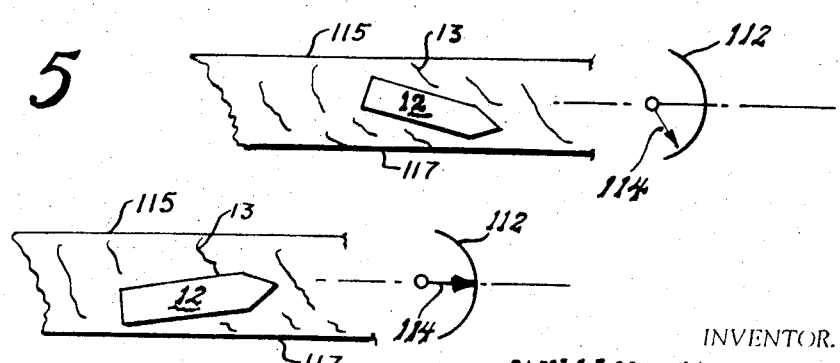
FIG. 5
FIG. 6
INVENTOR.
WILLIAM H. SWAIN
BY
Walter J. Kreske
ATTORNEY

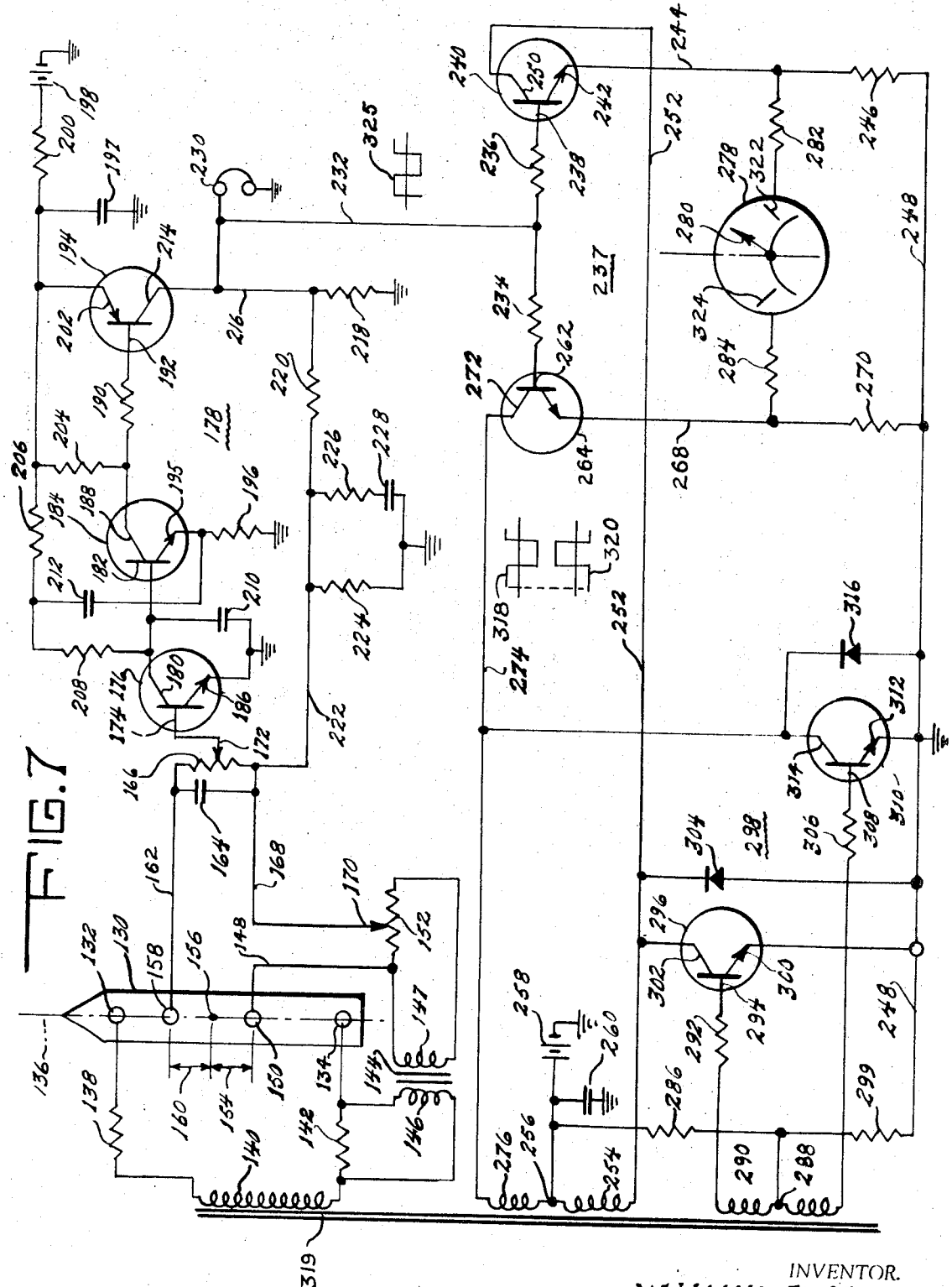

INVENTOR.
WILLIAM H. SWAIN
BY Walter J. Kreske
ATTORNEY

TRANSMITTER AND RECEIVER ELECTRODE METHOD AND APPARATUS FOR SENSING PRESENCE AND PROXIMITY OF UNDERWATER OBSTRUCTIONS

This invention relates to methods and means for object detection and more particularly to improved methods and means for sensing the proximity of an underwater object to an electrode immersed in the water. It is particularly applicable to sensing obstructions to passage of boats, ships and the like in waterways and inherently lends itself to operation as a channel follower and/or depth finder.

Heretofore, acoustical devices utilizing sonar techniques for propagating and receiving sound signals have provided the customary aid for underwater detection of objects, determination of distance or range to these objects, determination of water depth, bottom profile and the like. However, such sonar devices have severe practical limitations in that they are erratic and unreliable in turbulent waters or in waters containing bubbles, suspensions of mud, sand or other foreign matter. The degree of error usually increases with increase in turbulence, bubbles, suspensions or combinations of them. Also, sound echoes from schools of fish or boundaries of stratified layers of water such as caused by temperature inversions or changes in composition as may occur at the mouth of a river emptying into the ocean tend to cause erroneous sonar information. Additionally, engine, boat hull, propeller and other underwater noises seriously interfere with and affect the intelligibility of sound signals in sonar devices. And further, sonars tend to behave erratically with respect to short range targets because of sound wave reverberations, particularly in sonars designed for longer range observations. Sonar is also troublesome where secrecy of movement and position is desired. The sound signals emanating from a sonar device may travel relatively long distances and are relatively easily intercepted and used to disclose the position from which they are being sent. Moreover, the beam width of a sonar device is typically narrow, often undesirably limiting observation at any instant to a correspondingly small area. This objectionable characteristic is particularly pronounced where the sonar beam is fixed in orientation relative to the vessel in which it is installed. Thus, an undesirably restricted view of the vessel environment results, whereas, what is often needed and desired is an overall view of the environment and an indication of degree of overall obstruction hazard to the vessel, together with an indication of vessel travel direction for achieving minimum overall obstruction hazard.

These problems have been overcome by the present invention which also incorporates other desirable features and advantages. Among these other desirable features and advantages of the present invention are its capacity for operation with boats, ships and the like as a channel follower and/or depth finder, and in particular, a channel follower and depth finder which desirably becomes increasingly sensitive and accurate as the depth decreases and/or the channel becomes narrower, and whose inherent useful sensing range increases substantially proportionally with increase in size of vessel with which it is adapted to operate.

A primary object of the present invention is the provision of an improved method and means for sensing the presence and proximity of an electric terminal immersed in a fluid medium to an object immersed in the fluid medium.

Another object is the provision of an improved method and means for sensing the presence and proximity of an underwater electric terminal to underwater objects and obstructions to navigation such as a channel or river bank or wall; lake, river and ocean bottoms; posts, buoys, mines and the like.

And another object is the provision of an improved method and means having capacity for operation as a channel follower and/or depth finder for boats, ships and the like.

And a further object is the provision of an improved method and means for indicating channel course having optimum vessel clearance regardless of existing vessel attitude or lateral vessel position in the channel.

And another object is the provision of an improved channel follower and/or depth finder for boats, ships and the like which is operable in both salt and fresh water, under conditions of turbulence, bubbles and suspensions of mud, sediment or combinations thereof, as well as in conditions of water stratification such as from temperature inversions or variations in composition.

And a further object is the provision of an improved channel follower and/or depth finder which increases in sensitivity and accuracy as the depth decreases and/or the distance to the side of the channel or other obstruction decreases and thus need for indication of presence and proximity increases.

And a still further object is the provision of an improved method and means for sensing the presence and proximity of underwater objects without the use of such long ranging interceptable and position disclosing signals as sound, light and the like.

And another object is the provision of an improved method and means for sensing the presence and proximity of underwater objects to underwater electrodes with only relatively minor corrosion effects even in salt water.

These objects, features and advantages are achieved generally by providing a pair of transmitter electrodes adapted for fixing in spaced relation to each other in the fluid medium encompassing the object whose presence is to be sensed, an oscillator coupled for applying an alternating potential across the transmitter electrodes, at least one receiver electrode adapted for fixing between and in spaced relation to the transmitter electrodes in the fluid medium, and an electric signal measuring circuit coupled to the receiver electrode for measuring received electric signal changes in the receiver electrode with corresponding changes in relative position of the object and the receiver electrode.

By placing the receiver electrode in line with and equidistant from the transmitter electrodes, an arrangement for effectively sensing the object as a changing potential at the receiver electrode with movement of the object past the electrodes is thereby achieved.

By placing the receiver electrode in line with and closer to one of the transmitter electrodes and adapting the measuring circuit for measuring the receiver electrode potential with respect to a fixed reference, a suitable arrangement for measuring depth of fluid beneath the electrodes is thereby achieved.

By providing a second receiver electrode in line with the transmitter electrodes with each receiver electrode equidistant from a center position between the transmitter electrodes, and adapting the measuring circuit to measure the received signal potential across the receiver electrodes with respect to a known reference, improved depth finder operation for boats, ships and the like is thereby achieved.

By coupling the transmitter electrodes and receiver electrodes in the form of a bridge in the measuring circuit, with the transmitter electrodes supplying a balancing potential for the bridge, a high degree of accuracy in depth finder measurements is thereby achieved.

By providing a separate pair of electrodes at the transmitter electrodes for the balancing bridge potential, corrosion effects, particularly in salt water use, are thereby minimized.

By providing a phase sensitive detector in the measuring circuit with provision for comparing the receiver electrode signals with the oscillator signals, increased sensitivity and instrument range is thereby achieved.

By providing a separate pair of receiver electrodes in transverse relation to the transmitter electrodes and closer to one of the transmitter electrodes than the other and coupled to the measuring circuit for measurement of difference in received signal across the transversely positioned receiver electrodes, sensitivity to channel effect is thereby achieved, as well as a structure for operation as a combined channel follower and depth finder for boats, ships and the like.

These and other features, objects, and advantages of the present invention will be better understood from the following description taken in connection with the accompanying drawings and wherein:

FIG. 1 is a partially schematic and partially block functional diagram of a preferred embodiment of the invention in the form of a depth finder and channel follower;

FIG. 3 is a diagram for more clearly illustrating calibration and operation of the channel follower of FIG. 1;

FIG. 4 is a diagram for more clearly illustrating calibration and operation of the channel follower of FIG. 1;

FIG. 5 is a diagram for more clearly illustrating operation of the channel follower of FIG. 1;

FIG. 6 is a diagram for more clearly illustrating operation of the channel follower of FIG. 1;

FIG. 7 is a schematic diagram of an alternative embodiment of a depth finder in accordance with the present invention;

Referring to FIG. 1 in more detail, a preferred embodiment of an electrical device for sensing the presence and proximity of a material object in a fluid medium is designated generally by the numeral 10 which for illustrative purposes is in the form of a channel follower and depth finder particularly adapted for operation with a boat 12. While the channel follower and depth finder 10 is for illustrative purposes the preferred embodiment of the present invention and constitutes a major application of the invention, it should be understood that the FIG. 1 embodiment and principles involved therein also have other important applications as will become apparent as this description progresses.

Figure 14:
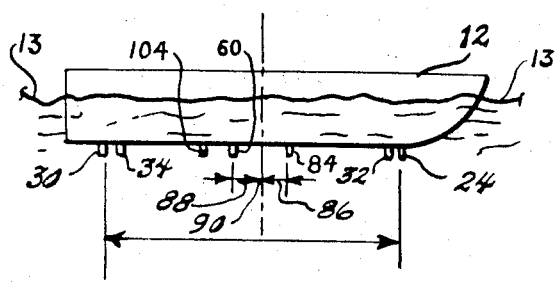
FIG. 14 is a side elevation of the boat in FIG. 1 for more clearly illustrating electrode positions.

The channel follower and depth finder 10 has a conventional oscillator 14 having preferably a square wave 16 voltage signal output across a primary 18 of an isolation transformer 20 having a secondary 22 with one side electrically coupled by an electric cable 23 to a transmitter electrode 24 fixed to extend downwardly (FIG. 14) from the bottom of the boat 12 at centerline 26 at the prow of the boat 12 and in electrical engagement with the water 13 supporting the boat. The other side of the isolation transformer secondary 22 is coupled through an electric cable 28 to a second electrode 30 preferably fixed to extend downwardly from the bottom of the boat 12 on the boat centerline 26 at the stern and in electrical engagement with the supporting water 13.

While the alternating potential 16 will tend to reduce electrode corrosion over that of a direct potential, to still further minimize operating errors from corrosion affects on the transmitter electrodes 24 and 30, a separate pair of receiver electrodes 32 and 34 are used. The receiver electrodes 32 and 34 may be similar to the transmitter electrodes and each preferably fixed to the bottom of the boat 12 at the centerline 26 close to the respective transmitter electrode and in electrical engagement with the water 13 supporting the boat 12. The receiver electrode 32 is coupled through an electric cable 36, parallel coupled voltage divider resistor 38 and potentiometer resistor 40, and electric cable 42 to the receiver electrode 34 at the stern of the boat 12. A centertap 44 on the voltage divider resistor 38 is coupled through an electric cable 46 to one side of a primary 48 of a balancing transformer 50. The other side of the primary 48 is coupled through an electric cable 52 to an adjustable wiper contact 54 on the potentiometer resistor 40.

The balancing transformer 50 has a secondary 56 coupled through an electric cable 58 to a depth finder receiver electrode 60. The other side of the secondary 56 is coupled through an electric cable 62 switch pole 64, movable arm 66 in a selector switch 68, and electric cable 70 to a variable gain amplifier 72 having a variable gain control 74. Another electric cable 76 couples the variable gain amplifier through a second movable switch arm 78, switch pole 80, and electric cable 82 to another depth finder receiver electrode 84. The depth finder receiver electrodes 60 and 84 may be similar to the receiver electrodes 32 and 34 and are fixed to extend downwardly from the bottom of the boat 12 on the centerline 26, each an equal distance 86 and 88 respectively from a point 90 midway between the receiver electrodes 32 and 34. The spacing 86 plus 88 between the depth finder electrodes 84 and 60 is found to provide best operating results when proportioned to be approximately equal to one-tenth the distance between the receiver electrodes 32 and 34 and placed equidistant from the receiver electrodes 32 and 34 respectively. It should be noted here that while this proportional relationship has been found to be most desirable, other spacings and placements may also be found to provide suitable results for some purposes.

The moveable switch arms 66 and 78 are coupled together by a mechanical linkage 92 for simultaneous manual movement to another pair of selector switch poles 94 and 96 coupled through electric cables 98 and 100 to a pair of channel follower receiver electrodes 102 and 104 respectively fixed to extend downwardly from the bottom of the boat 12 in electrical engagement with the water carrying the boat 12. The channel follower receiver electrodes 102 and 104 are each on a respective side of the centerline 26 by equal distances 103 and 105 therefrom and closer to the electrode 34 than the electrode 32 by a distance 106. Both the distance 106 and spacing 103 plus 105 have been found most suitable for practical operation then they are equal to approximately one-tenth the distance between the electrodes 32 and 34.

Thus, when selector switch arms 66 and 78 are moved downwardly, electrical contact is made with channel follower poles 94 and 96 and depth finder switch poles 64 and 80 are open. When switch arms 66 and 78 are moved upwardly, electrical contact is made with depth finder switch poles 64 and 80 and channel follower switch poles 94 and 96 are open. Resulting operation from such closing of the respective depth finder and channel follower switch poles by switch arms 66 and 78 will be hereinafter further described.

The square wave signal 16 is also fed from the oscillator 14 through an electric cable 107 to a phase sensitive detector 108 such as illustrated in the FIG. 7 embodiment. The output of the variable gain amplifier 72 is also fed through an electric cable 109 to the phase sensitive detector 108 where the output signal of the amplifier 72 is compared to the signal 16 from the oscillator 14 for phase and amplitude and the resulting signal output of the phase sensitive detector 108 is, as of each instant, the product of the output of the amplifier 72 and the output of the oscillator 14. This phase sensitive detector output is fed through electric cable 110 to a conventional DC voltage indicator 112 suitably calibrated as will be hereinafter further described.

OPERATION OF FIG. 1 CHANNEL FOLLOWER

In the operation of the FIG. 1 channel follower, the moveable arms 66 and 78 of the selector switch 68 are moved downwardly to engage the channel follower switch poles 94 and 96 respectively for thereby completing the circuit from the channel follower receiver electrode 104 through line 100, selector switch pole 96, switch arm 78, line 76 to the variable gain amplifier 72; and also completing the circuit from the other channel follower receiver electrode 102, line 98, switch pole 94, switch arm 66, and electric cable 70 to the variable gain amplifier 72.

Figure 2:
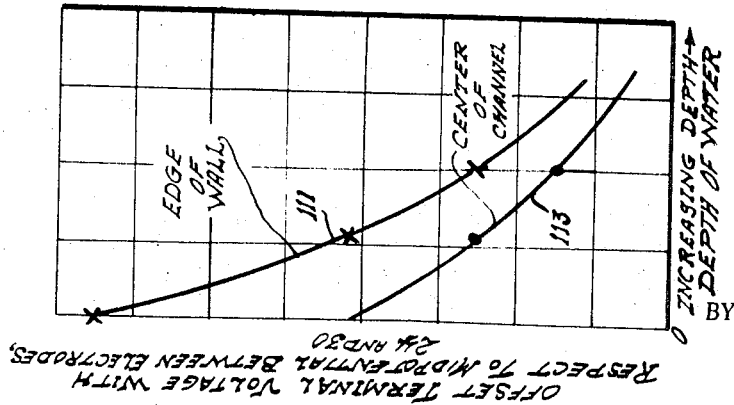
FIG. 2, is a graph for more clearly illustrating operation of the FIG. 1 embodiment.

The oscillatory voltage signal 16 from the oscillator 14 appears through the isolation transformer 20 across the transmitter electrodes 24 and 30. In this regard, it has been empirically found that the channel follower receiver electrode 102 or 104, which ever is the nearer to a shore bank or wall, will more nearly approach the potential of the nearer transmitting electrode which in the present instance is the transmitting electrode 30. The channel follower receiver electrodes 102 and 104, each approximate a potential between the potentials of the transmitting electrodes 24 and 30 given by linear geometry —analogous to a slide wire resistor —if the water 13 becomes so shallow as to be considered a thin film around the boat 12. However, if the water 13 about the boat 12 is very deep, the channel follower receiver electrodes 102 and 104 more nearly approach the midpotential between the transmitter electrodes 24 and 30, even though the channel follower receiver electrodes 102 and 104 are offset by the distance 106. This observed phenomenon which is herein referred to as the channel follower effect was experimentally verified and is represented qualitatively in the FIG. 2 graph. The curve 111 in FIG. 2 represents the potential of a single electrode such as 102 when placed on the centerline 26 and the boat is close to a channel wall or bank while the depth of the water is varied. Curve 113 represents the potential of the same electrode when the boat 12 is in open water on all sides and only the depth of the water is varied. It will be noted that these experimentally found curves show that two channel follower terminals such as 102 and 104, each located respectively on the port and starboard sides of the boat 12 will be different distances from a bank or wall near one side of the boat 12 and will thereby be at different potentials regardless of depth of water.

This potential difference of the channel follower receiver electrodes 102 and 104 is fed through the selector switch 68 and electric cables 70 and 76 to the variable gain amplifier 72 whose amplified output is fed to one side of the phase sensitive detector 108. It is there compared to the signal 16 also appearing through line 107 at the phase sensitive detector 108 and the averaged product of the compared signals is indicated on the dial of the voltmeter 112. For calibrating the dial of the voltmeter 112 for channel following, a conventional balancing adjustment is preferably made in the phase sensitive detector 108 to obtain a center or neutral reading with indicator hand 114 preferably pointing vertically when the boat 12 is in open water with no obstructions on any side or in the center of a deep channel with similar walls on each side of the boat 12.

Thereupon, the gain control 74 of the variable gain amplifier 72 is adjusted for full scale reading to the left when the boat 12 is near a port wall 115 as shown in FIG. 3, and full scale reading to the right when the boat 12 is near a starboard wall 117 as shown in FIG. 4.

It has been found that with the above calibration performed, the indicator hand 114 conveniently indicates error in boat 12 channel position and will point to correct channel course for the boat 12 when it is vertical, that is, pointing midway between the left and right full scale readings. For example, if the boat 12 is in the center of the channel, but headed for a starboard bank as shown in FIG. 5, the present channel follower invention will inherently, due to the above mentioned channel follower effect, show the lead error on the indicator hand 114. Also, if the boat 12, for example, is too close to starboard bank 117 but headed for the center of the channel, the indicator hand 114 will inherently show that the boat is on a proper course as shown in FIG. 6. Thereby, a boat pilot may easily correct direction of travel of the boat 12 for optimum channel course by steering in a direction to achieve a vertical indicator hand 114.

Figure 8:
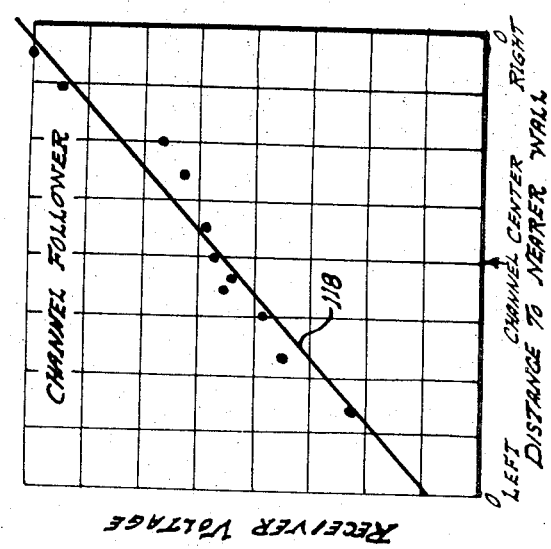
FIG. 8 is a graph for more clearly illustrating operation of the FIG. 1 channel follower.

Also, the calibration of the indicator 112 may be used for determining actual distance from one side or the other of a known channel because of the substantially linear change in voltage differential at the channel follower receiver electrodes 102 and 104 with distance to the nearer channel wall as shown by the FIG. 8 graph line 118 drawn through a plurality of points made under known channel conditions where the abscissa arrow mark represents the center of the channel.

OPERATION OF FIG. 1 DEPTH FINDER

Figure 9:
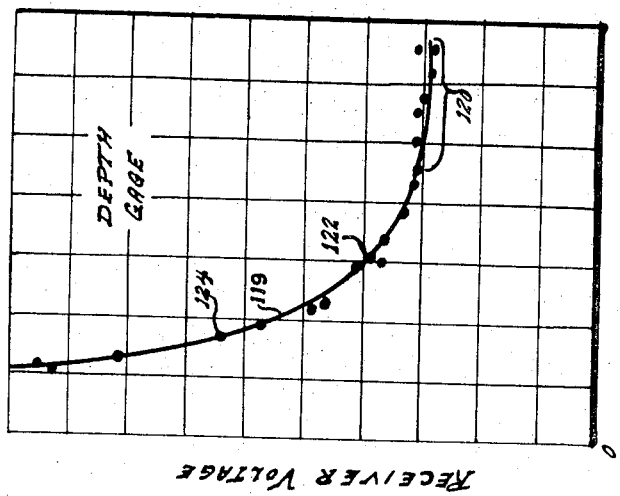
FIG. 9 is a graph for more clearly illustrating operation of the depth finder embodiment of the present invention.

In the operation of the FIG. 1 depth finder, the moveable arms 66 and 78 of the selector switch 68 are moved upwardly to electrically engage the depth finder switch poles 64 and 80 respectively as shown in FIG. 1. The oscillatory signal 16 from the oscillator 14 across the transmitter electrodes 24 and 30 effects a current through the transmitter electrodes 24 and 30 and water 13 surrounding the boat 12. The depth finder receiver electrodes 60 and 84 being offset a distance 86 and 88 respectively from the center point 90 between the transmitter electrodes 24 and 30 will always have a finite potential because of their offset positions. Voltage across the depth finder receiver electrodes 60 and 84 is found to be a function of the depth of water 13 under the boat 12 for a given current of the transmitter electrodes 24 and 30 and may be represented by the curve 119 in the graph of FIG. 9. Referring to FIG. 9, it will be noted that the portion 120 of the curve 119 is the response for deep water which represents no problem to navigation, whereas, the remainder of the curve 119 becomes increasingly linear and sensitive as the depth of water decreases and the need for knowledge as to depth increases.

For the purpose of providing a suitable reference or bridge balance for the potential across the depth finder receiver electrodes 60 and 84, a portion of the signal between the transmitter electrodes 24 and 30 is picked up by the receiver electrodes 32 and 34 for creating a potential across the voltage divider resistor 38 and potentiometer resistor 40. Thereby, adjustment of the potentiometer resistor wiper 54 permits the creation of a suitable balancing potential in the circuit comprised of depth finder receiver electrode 60, electric cable 58, balancing transformer secondary 56, electric cable 62, switch pole 64, switch arm 66 and electric cable 70 to the variable gain amplifier 72. It will be noted that the wiper arm 54 on the potentiometer resistor 40 makes possible a wide range of both positive and negative balancing potentials. Thus by suitable adjustment of the wiper 54 and gain control 74 of the amplifier 72, the indicator hand 114 may be set at full scale reading when the boat 12 is in deep water and the face of the indicator 112 marked for position of the indicator hand 114 for various known diminishing depths of water to that which is minimal for passage of the boat 12, such as for example indicated by the points 120, 122 and 124 on the curve 119 in FIG. 9.

The indicator 112 having been calibrated in this manner for known depths, will then repetitively indicate such depths with indicator hand 114 as they recur.

FIG. 7 EMBODIMENT

Referring to FIG. 7 in more detail, therein is a schematic circuit diagram of an alternative embodiment of a depth finder in accordance with the present invention and includes schematically shown oscillator, amplifier and phase sensitive detector circuits which are also suitable for use for those shown in block form in FIG. 1.

In FIG. 7, a boat 130 has a fore and aft transmitter electrodes 132 and 134 respectively which may be similar to the electrodes 24 and 30 of FIG. 1 and similarly fixed to project downwardly from the bottom of the boat at the boat centerline 136 and in electrical engagement with the water surrounding the boat 130. The transmitter electrode 132 is coupled through a current limiting resistor 138, a transformer secondary 140 and a balancing circuit resistor 142 to the transmitter electrode 134. A balancing circuit transformer 144 has a primary 146 coupled across the resistor 142, and one side of its secondary 147 coupled through an electric cable 148 to a depth finder electrode 150 and a potentiometer resistor 152 to the other side of the secondary 147. The depth finder electrode 150 may be similar to the electrode 60 in FIG. 1 and similarly positioned a distance 154 from a center point 156 between the transmitter electrodes 132, 134 on the centerline 136 and fixed to extend from the bottom of the boat 130 in electrical engagement with the surrounding water.

Another similar depth finder receiver electrode 158 positioned an equal distance 160 on the opposite side of the center point 156 is fixed to extend from the bottom of the boat 130 at the centerline 136 and in electrical engagement with the surrounding water. The distance 154 plus 160 is preferably equal to about one tenth the distance between the transmitter electrodes 132 and 134.

The depth finder receiver electrode 158 is coupled through an electric cable 162, parallel coupled filter capacitor 164 and gain control potentiometer resistor 166, and electric cable 168 to an adjustable balancing resistor wiper 170 on the balancing resistor 152. The gain control potentiometer resistor 166 has an adjustable wiper 172 coupled to a base 174 of a transistor 176 forming the first stage of a three stage variable gain transistor amplifier 178. The transistor 176 has a collector 180 coupled to a base 182 of a transistor 184, forming the second stage of the variable gain amplifier 178, and an emitter 186 coupled to ground. The transistor 184 has a collector 188 coupled through a resistor 190 to base 192 of a transistor 194 forming the third stage of the variable gain amplifier 178. The transistor 184 also has an emitter 195 coupled through a resistor 196 to ground. A source of positive potential such as the positive terminal of a battery 198 is coupled through a current limiting resistor 200 to emitter 202 of the transistor 194 and to one side of a smoothing capacitor 197, the other side of which is coupled to ground. The positive terminal of the battery 198 is also coupled through resistors 200 and 204 to the collector 188 and through resistors 200, 206 and 208 to the collector 180 of the transistor 176. The collector 180 and base 182 are coupled through high frequency attenuating capacitor 210 to ground. Emitter 195 is coupled through a capacitor 212 to a point between the resistors 206 and 208.

The transistor 194 has a collector 214 coupled through an electric cable 216 and a resistor 218 to ground, and through a resistor 220 and an electric cable 222 to the electric cable 168 leading to the balancing adjustable wiper 170. The electric cable 222 is also coupled through resistor 224 to ground and series resistor 226 and capacitor 228 to ground. The electric cable 216 is also coupled to earphones 230 and through electric cable 232 to one side of each of a pair of current limiting resistors 234 and 236 in a phase sensitive detector circuit 237 which is also suitable for use as the phase sensitive detector circuit 108 in FIG. 1. The other side of resistor 236 is coupled to a base 238 of a transistor 240 whose emitter 242 is coupled through an electric cable 244 and a resistor 246 to a grounded electric cable 248. The term "grounded" as here used means grounded to a suitable internal reference and not grounded to the boat 130. The transistor 240 has a collector 250 coupled through an electric cable 252, transformer secondary lower half 254, and centertap 256 to a source of positive potential such as the positive terminal of a battery 258, the negative terminal of which is coupled to ground. A smoothing capacitor 260 is also coupled across the battery 258.

The other side of current limiting resistor 234 is coupled to a base 262 of a transistor 264 having an emitter 266 coupled through an electric cable 268 and a resistor 270 to the grounded electric cable 248. The transistor 264 also has a collector 272 coupled through an electric cable 274, transformer secondary upper half 276, and centertap 256 to the positive terminal of the battery 258.

A conventional DC voltmeter 278 having an indicator hand 280 is coupled on one side through a resistor 282 to the electric cable 244 and on the other side through a resistor 284 to the electric cable 268.

The positive terminal of battery 258 is also coupled through a resistor 286 to a centertap 288 of a transformer primary 290, one end of which is coupled through a resistor 292 to a base 294 of a transistor 296 in a square wave oscillator 298 known as a Royer oscillator. The centertap 288 is also coupled through a resistor 299 to the grounded cable 248. The transistor 296 has an emitter 300 coupled to the grounded cable 248 and a collector 302 coupled to the cable 252. A diode 304 is also coupled across the collector 302 and emitter 300.

The other end of the primary 290 is coupled through resistor 306 to a base 308 of a transistor 310 having an emitter 312 coupled to the grounded cable 248 and a collector 314 coupled to the cable 274. A diode 316 is coupled across the collector 314 and emitter 312.

By way of further illustration, commercial identification and component values which have been found to provide a working structure in the FIG. 7 embodiment are presented in the following table:

Resistor 138—20 ohms.
Resistor 142—1.4 ohms.
Resistors 152, 246, 270, 282—1,000 ohms each.
Resistor 166—3,500 ohms.
Resistors 190, 234, 236—2,200 ohms each.
Resistor 196—330 ohms.
Resistor 226—10 ohms.
Resistors 204, 208—10,000 ohms each.
Resistor 206—4,700 ohms.
Resistor 218—180 ohms.
Resistors 220, 292, 299, 306—47 ohms each.
Resistor 224—22,000 ohms.
Resistor 284—2,000 ohms.
Resistor 286—100 ohms.
Capacitor 164—.01 micro farads.
Capacitors 197, 212—22 micro farads each.
Capacitor 210—2,000 micro micro farads.
Capacitor 228—250 micro farads.
Capacitor 260—33 micro farads.
Transistors 176, 184—type 2N2926.
Transistors 240, 264—type 2N2923.
Transistors 296, 310—type 2N1485m.
Diodes 304, 316—type 1N3255.
Batteries 198, 258—7 volts each.

While the above table presents a specific operable structure, it should be understood that such specific structure is presented here for illustrative purposes and not limitation and that other component values and structural variations will be apparent to those skilled in the art without departing from the spirit and scope of the present invention which is intended to be limited only by the claims appended hereto.

In the operation of the FIG. 7 embodiment, the transistors 296 and 310 will be caused to alternately turn on and off to produce a square wave oscillation in the primary 290 which being on a common transformer core 319 with the secondary elements 254 and 276 induces oppositely phased square wave oscillations 318 and 320 through electric cables 274 and 252 at the collectors 272 and 250 respectively in the phase sensitive detector 237.

The secondary 140 also being the same transformer core 319 will have induced therein the square wave oscillations from the Royer oscillator 298 and will cause them to appear across the transmitter electrodes 132 and 134 extending from the bottom of the boat 130. A resulting oscillatory signal will be picked up by the depth finder receiver electrodes 150 and 158. Also current through the resistor 142 will cause a balancing square wave signal through the transformer 144 and across the balancing potentiometer resistor 152. By suitably adjusting the potentiometer wiper 170 on the balancing resistor 152, the oscillatory signal picked up by the depth finder electrodes 150 and 158 may be balanced out as a suitable reference or null point for a given known depth condition such as when deep water at the practical limit of the instrument is known to exist under the boat 130. Under such null condition there will be no signal across the gain control potentiometer resistor 166 and thus no signal output in the output line 232 of the variable gain amplifier 178. The meter 278 may be set for a full scale reading of the indicator hand 280 such as at 322 for the above known null calibration condition.

The boat 130 may then be positioned in a minimum navigable depth of water for the boat 130 and the gain of the amplifier 178 adjusted with the wiper arm 172 on the gain control potentiometer resistor 166 for a full scale reading of the pointer 280 such as at 324 on the meter 278 in a direction opposite to that of the deep water reading.

The boat 130 may then be positioned in various intermediate known depths of water to mark suitable intermediate calibrations on the face of the meter 278. The above calibration having been made under such known conditions, the indicator hand 280 will thereafter automatically indicate depth of water under the boat 130.

As explained above, the signal appearing across the gain control resistor 166 is a square wave picked up by the receiver electrodes 150 and 158. After amplification by the amplifier 178 it will appear as a square wave 325 through the electric cable 232 and resistors 234 and 236 at the bases 262 and 238 of transistors 264 and 240 respectively. The affect of the square wave 325 on current conduction of the transistors 264 and 240 will be dependent upon its intensity and phase relation to the square waves 318 and 320 appearing at the collectors 272 and 250 respectively. It has been found that this relationship varies with depth of water and lends itself to suitable calibration of a meter 278 for suitable repetitive indication of depth of water as described above.

Additionally an audio warning indication of approaching shallow water may be obtained by the use of earphones 230 or a loudspeaker or other suitable alarm at amplifier output line 232 where change in signal intensity may provide audio indication of change in water depth.

It will be noted that the Royer oscillator 298 is a square wave oscillator which is also suitable for use as the oscillator 14 in FIG. 1 embodiment. Also, while a square wave oscillator has been preferably used in the present FIGS. 1 and 7 embodiments because of the economy of construction and efficiency of operation, other types of oscillators and oscillatory signal patterns such as sine wave may also be used.

Additionally, it should be noted that the variable gain amplifier 178 of FIG. 7 is also suitable for use as the amplifier 72 in FIGS. 1, 10, 11 and 12 embodiments and the phase sensitive detector 237 of FIG. 7 is suitable for use as the phase sensitive detector 108 in the FIG. 1 embodiment.

FIG. 10 EMBODIMENT

Figure 10:
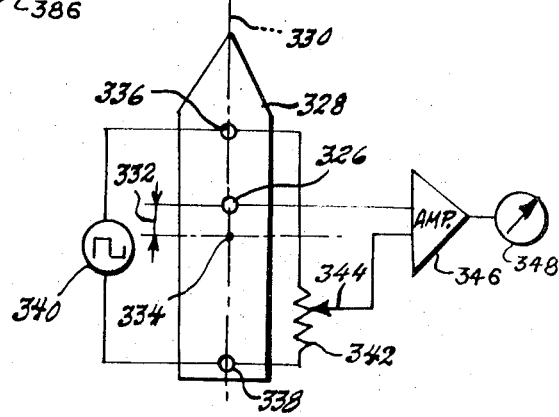
FIG. 10 is a partially block and partially schematic diagram of another embodiment of a depth finder in accordance with the present invention.

Referring to FIG. 10 in more detail, therein is shown an embodiment for those applications not requiring the high degree of sensitivity possible with the FIGS. 1 and 7 embodiments. In FIG. 10 a single receiver electrode 326 is fixed to extend into the water from the bottom of the boat 328 at the longitudinal centerline 330 and a distance 332 from a midpoint 334 between transmitter electrodes 336 and 338 which likewise are fixed to extend into the water at the centerline 330 of the boat 328. The distance 332 is preferably equal to one-fifth to one-tenth the distance between the transmitter electrodes 336 and 338. The transmitter electrodes 336 and 338 and receiver electrode 326 may be similar to the corresponding electrodes in the FIG. 1 embodiment.

An oscillator 340 which may be similar to the oscillator 14 is electrically coupled across the transmitter electrodes 336 and 338 for applying an alternating potential thereto. A potentiometer resistor 342 is also coupled across the electrodes 336 and 338 for providing at adjustable potentiometer wiper 344 a reference potential preferably the neutral or midpotential between the transmitter electrodes 336 and 338. The potentiometer wiper 344 provides a reference or substitute terminal taking the place of the second depth finder receiver electrode 60 in the FIG. 1 embodiment.

The receiver electrode 326 and wiper 344 are coupled to an amplifier 346 whose output is coupled to an electric meter 348. The amplifier 346 may be similar to the amplifier 72 of FIG. 1 and the electric meter may be similar to the meter 112 of FIG. 1. Calibration of the meter 348 may be carried out as described in connection with the FIG. 7 embodiment, where upon the meter 348 will indicate directly depth of water beneath the boat 328.

FIG. 11 EMBODIMENT

Figure 11:
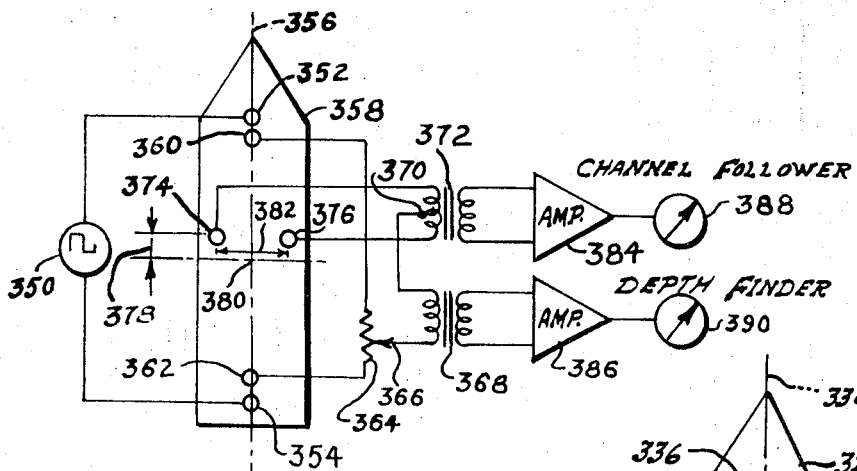
FIG. 11 is a partially block and partially schematic diagram of a further embodiment of a combined channel follower and depth finder in accordance with the present invention.

FIG. 11 illustrates a further embodiment which combines both a channel follower and a depth finder having capacity for giving simultaneous readings of depth and direction for best channel course. In FIG. 11 an oscillator 350 which may be similar to the oscillator 14 is coupled to apply an alternating voltage signal across a pair of transmitter electrodes 352 and 354 fixed to extend downwardly from the bottom of a boat 358 on longitudinal centerline 356 and in electrical engagement with the supporting water. The transmitter electrodes 352 and 354 may be similar to the electrodes 24 and 30 of FIG. 1. A pair of reference receiver electrodes 360 and 362, which may be similar to the receiver electrodes 32 and 34 of FIG. 1 and similarly placed, are electrically coupled through a potentiometer resistor 364 carrying an adjustable wiper 366 coupled to one end of a primary of a depth finder transformer 368, the other end of which is coupled to a centertap 370 of a primary of a channel follower transformer 372. The primary of the channel follower transformer 372 is coupled across a pair of combined channel follower and depth finder electrodes 374 and 376. The receiver electrodes 374 and 376 may be similar to the receiver electrodes 102 and 104 of FIG. 1 and placed a distance 378 from a center point 380 which is preferably equal to one-fifth to one-tenth the distance between the electrodes 352 and 354. While the spacing 378 is shown forward of the center point 380 as distinguished from rearward spacing 116 in FIG. 1, such forward spacing 378 results in reversal of attitude sense to position sense signal polarity and is shown here to illustrate that such forward spacing is usable in the present invention when properly interpreted. The transverse spacing 382 between the electrodes 374 and 376 is also preferably equal to one-fifth to one-tenth the distance between the transmitter electrodes 352 and 354.

The channel follower transformer 372 has a secondary coupled to the input of an amplifier 384 which may be similar to the amplifier 72 of FIG. 1. The depth finder transformer 368 has a secondary coupled to the input of an amplifier 386 which may also be similar to the amplifier 72 of FIG. 1. The outputs of transformers 384 and 386 are each coupled to an electric meter 388 and 390 respectively which may be similar to the meter 112.

Calibration of the channel follower meter 388 may be carried out under known conditions in similar manner to that described with respect to the channel follower in FIG. 1 and calibration of the depth finder meter 390 may be carried out in manner similar to that described with respect to FIG. 1 and FIG. 10 with the wiper 366 being preferably set at a neutral or centerpotential position on resistor 364. Thereafter, the meters 388 and 390 will simultaneously indicate direction for optimum channel course and depth of water respectively. The centertap 370 has the effect of a single depth finder electrode such as 326 of FIG. 10 placed between the channel follower electrodes 374 and 376.

FIG. 12 EMBODIMENT

Figure 12:
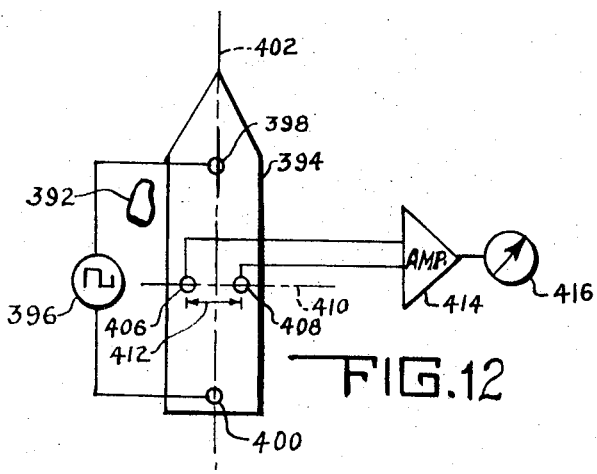
FIG. 12 is a block diagram of an object sensing device in accordance with the present invention.

The FIG. 12 embodiment provides indication of an immersed obstruction such as a post, mine or other material body 392, as relative movement between it and a boat 394 or other vessel carrying the FIG. 12 embodiment occurs. In FIG. 12 an oscillator 396 such as the oscillator 14 is coupled to apply an alternating potential signal across transmitter electrodes 398 and 400. The transmitter electrodes 398 and 400 may be similar to the electrodes 24 and 30 of FIG. 1 and similarly placed on a centerline 402 and extending downwardly in electrical engagement with water supporting the boat 394. A pair of receiver electrodes 406 and 408 which may be similar to electrodes 102 and 104 of FIG. 1 are fixed to extend downwardly in engagement with the supporting water as in FIG. 1 except in that they are on a transverse line 410 midway between the transmitter electrodes 398 and 400. The receiver electrodes 406 and 408 are separated a distance 412 preferably equal to one-fifth to one-tenth the distance between the transmitter electrodes 398 and 400 and equidistant from the centerline 402. The receiver electrodes 406 and 408 are coupled to the input of an amplifier 414 which may be similar to the amplifier 72 of FIG. 1. The output of the amplifier 414 is coupled to an electric meter 416 which may be similar to the meter 112 of FIG, 1.

Figure 13:
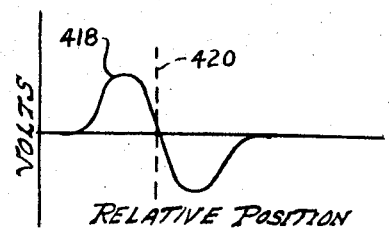
FIG. 13 is a graph for more clearly illustrating operation of the FIG. 12 embodiment.

In the peration of the FIG. 12 embodiment, the meter 416 will display a voltage deflection such as illustrated by a curve 418 in FIG. 13 when the boat 394 passes an immersed obstruction or other material object 392. The vertical broken line 420 in FIG. 13 indicates the meter reading when the object 392 reaches the transverse centerline 410 in FIG. 12.

This invention is not limited to the particular details of construction and operation herein described, as equivalents will suggest themselves to those skilled in the art. For example, while a square wave oscillatory signal has been used herein as preferred for achievement of economy of construction and operation, other wave forms such as sine waves may also be used or even direct voltages and currents in limited special cases. Also, while the FIG. 7 embodiment illustrates a depth finder only, it may include a channel follower as well by applying the teaching of the FIG. 1 embodiment with the addition of transverse channel follower electrodes. By way of further example, in those instances where additional sensitivity and range is desired in the FIGS. 10, 11 and 12 embodiments, the addition of a phase sensitive detector such as taught in the FIGS. 1 and 7 embodiments may be made, and separate reference electrodes such as 32 and 34 in FIG. 1 and 360 and 362 in FIG. 11 are applicable to all the embodiments for minimizing corrosive effects on operation particularly in salt water.

We claim:

1. In an apparatus for sensing proximity of material obstructions in a fluid medium the combination of a pair of transmitter electrodes in spaced relation to each other in electrical engagement with the fluid medium, means for applying an electrical potential signal across said transmitter electrodes, at least one receiver electrode in electrical engagement with the fluid medium between and in spaced relation to the transmitter electrodes at a position along an imaginary line of symmetry through said transmitter electrodes closer to a center position between said transmitter electrodes than to either of said transmitter electrodes and spaced a substantial distance from said center position, carrier means rigidly fixing said electrodes in place for movement in said medium with said electrodes carried in the same relative positions with respect to each other, means coupled to said transmitter electrodes for deriving a reference potential, and electric signal measuring means coupled to the receiver electrode and reference means for measuring said signal at said receiver electrode with respect to said derived reference potential and including indicator means calibrated for said signal measurement to indicate proximity of such obstruction beneath said electrodes.

2. The combination as in claim 1 wherein said fluid medium is water.

3. The combination as in claim 2 wherein said signal is an oscillatory signal.

4. The combination as in claim 3 wherein said measuring means includes a phase sensitive detector coupled for comparing said receiver electrode signal as appearing with respect to said reference potential to said oscillatory signal applied to the transmitter electrodes:

5. The combination as in claim 3 wherein said reference means includes a second receiver electrode fixed to said carrier means in electrical engagement with the water in line with the transmitter electrodes and displaced from said center position between said transmitter electrodes by the same distance as said first mentioned receiver electrode and on the opposite side of said center position from that of said first mentioned receiver electrode, said receiver electrodes being separated by a distance equal to about one-tenth to one-fifth the distance between said transmitter electrodes, and said reference means is coupled to both said receiver electrodes.

6. The combination as in claim 5 wherein said measuring means includes a signal balancing circuit coupled to said signal applying means and receiver electrodes for providing an electric bridge balance for said receiver electrode signal.

7. In an apparatus for sensing proximity of material obstructions in a fluid medium the combination of a pair of transmitter electrodes in spaced relation to each other and in electrical engagement with the fluid medium, means for applying an oscillatory electric potential signal across said transmitter electrodes, at least one pair of receiver electrodes in electrical engagement with the fluid medium on an imaginary receiver electrode line in transverse relation to an imaginary line of symmetry through said transmitter electrodes and on respective sides of said line of symmetry, said receiver electrode line being substantially closer to one of said transmitter electrodes than the other of said transmitter electrodes, carrier means rigidly fixing said electrodes in place for movement in said medium with said electrodes carried in the same relative positions with respect to each other, means coupled for measuring the signal across said receiver electrodes and including an indicator calibrated for said signal measurement to indicate the side proximate to a laterally disposed obstruction.

8. The combination as in claim 7 wherein said receiver electrode line is displaced from a center position between said transmitter electrodes by a distance equal to between one-fifth and one-tenth said transmitter electrode spacing.

9. The combination as in claim 7 wherein said receiver electrodes are separated by a distance equal to about one-tenth to one-fifth the distance between said transmitter electrodes and said imaginary receiver electrode line is displaced from a midpoint between said transmitter electrodes by a distance equal to about one-tenth to one-fifth the distance between said transmitter electrodes.

10. The combination as in claim 7 wherein said signal means includes a square wave oscillator; and said measuring means includes an amplifier coupled to said receiver electrodes, a phase sensitive detector coupled to said amplifier and oscillator for comparing said receiver electrodes and oscillator signals, indicator means coupled to said phase sensitive detector and calibrated for neutral indication when said transmitter electrodes are aligned with and in the center of a channel and for indication on respective sides of said neutral indication when said transmitter electrodes are displaced toward respective sides of said channel.

11. The combination as in claim 9 wherein said signal means includes a square wave oscillator; and said measuring means includes an amplifier coupled to said receiver electrodes, a phase sensitive detector coupled to said amplifier and oscillator for comparing said receiver electrodes and oscillator signals, indicator means coupled to said phase sensitive detector and calibrated for neutral indication when said transmitter electrodes are aligned with and in the center of a channel and for indication on respective sides of said neutral indication when said transmitter electrodes are displaced toward respective sides of said channel.

12. The combination as in claim 11 wherein said indicator means includes audio alarm signal means arranged for audio indication at selected indicator values on respective sides of said neutral indication.

13. In an apparatus for sensing material obstructions in a water medium the combination of a pair of transmitter electrodes in spaced relation to each other in electrical engagement with said medium; means for applying an oscillatory electrical potential signal across said transmitter electrodes; two receiver electrodes in line with said transmitter electrodes and in electrical engagement with said medium, each receiver electrode being displaced on a respective side from a center position between said transmitter electrodes with the distance between the receiver electrodes being between one-tenth and one-fifth said transmitter electrode spacing; and electric signal measuring means coupled to said receiver electrodes for measuring the signal at said receiver electrodes, said measuring means including a signal balancing circuit coupled to said signal applying means and receiver electrodes for providing an electric bridge balance for said receiver electrode signal, a third pair of electrodes with each fixed close to a corresponding one of said transmitter electrodes, a voltage divider resistor and potentiometer resistor coupled in parallel across said last mentioned electrodes, a centertap on the voltage divider resistor, an adjustable wiper on the potentiometer resistor, and a balancing transformer having a primary coupled to said centertap and adjustable wiper, and a secondary coupled in series with one of said displaced receiver electrodes.

14. The combination as in claim 13 wherein said measuring circuit has additionally means for amplifying said bridge balanced receiver electrode signal, and a phase sensitive detector coupled to said amplifier means and transmitter electrode signal applying means for comparing said amplified signal and transmitter means signal.

15. The combination as in claim 14 having additionally a pair of receiver channel follower electrodes in spaced relation to each other transversly to and on respective sides of said in line electrodes and displaced from said center position by a distance equal to one-fifth to one-tenth of the spaced relation of said transmitter electrodes, and means for coupling said channel follower receiver electrodes to said signal measuring means.

16. The combination as in claim 15 including additionally a boat having a bottom substantially symmetrical on either side of a center axis and said electrodes are fixed to electrically engage said water at said bottom with said transmitter and in line electrodes being on said axis.

17. In an apparatus for sensing material obstructions in a water medium the combination of a pair of transmitter electrodes in spaced relation to each other in electrical engagement with said medium; means for applying an oscillatory electrical potential signal across said transmitter electrodes; two receiver electrodes in spaced relation to each other, equally distant from a center position between said transmitter electrodes, in transverse relation to said transmitter electrodes and displaced from said center position by a distance equal to between one-fifth and one-tenth said transmitter electrode spacing; and electric signal measuring means coupled to said receiver electrodes for measuring the signal at said receiver electrodes, said measuring means including a channel follower transformer with a primary coupled across said receiver electrodes, a centertap on said primary, a reference signal source, and a depth finder transformer having a primary coupled to said centertap and reference signal source, thereby effecting across said channel follower transformer electric signals having an intensity correlation to orientation of said transmitter electrodes in a channel and across said depth finder transformer electric signals having an intensity correlation to depth of said medium.

18. The method of sensing the presence and proximity of a material obstruction in a fluid medium comprising the steps of applying an oscillatory electric signal potential to the fluid medium across two spaced apart small area positions in said medium, measuring the resulting signal potential at a third small area position in the medium with respect to a fourth small area position under conditions of known material obstructions within the useful measuring range, the third position and fourth position being on an imaginary line transverse to an imaginary line of symmetry through said first mentioned positions and on respective sides of said line of symmetry and substantially closer to one of said first mentioned positions than to the other of the first mentioned positions, and indicating the amount of any change in the measured signal potential at the third position under conditions of unknown material obstructions in the fluid medium in terms of the side proximate to a laterally disposed obstruction.

19. The method as in claim 18 wherein said fourth small area position in said medium is spaced from the third position by a distance equal to about one-tenth to one-fifth the distance between the first mentioned two positions for providing said reference signal potential for the measurement of the resulting signal potential at the third position.

20. The method of sensing the presence and proximity of material obstruction in a fluid medium comprising the steps of applying an oscillatory electric potential to the fluid medium across two spaced apart small area positions in said medium, measuring the resulting signal potential at a third small area position in the medium with respect to a fourth small area position under conditions of known material obstruction within the useful measuring range, the third and fourth positions being along an imaginary line of symmetry through the first and second positions and spaced a substantial distance from a center point between said first and second positions, and indicating the amount of any change in the measured signal potential at the third position with respect to said fourth position under unknown material obstruction in the fluid medium in terms of proximity to such obstruction beneath said positions.

21. The method as in claim 20 wherein the third and fourth positions are spaced by a distance equal to about one-tenth to one-fifth the distance between the first mentioned two positions.

22. In a ship mounted apparatus for sensing proximity of material underwater obstructions to movement of said ship through the water to facilitate guidance of said ship in manner to avoid contact with such obstructions, the combination of a pair of transmitter electrodes mounted on the hull of said ship in spaced relation to each other in electrical engagement with said water, means for applying an electrical potential signal across said transmitter electrodes, at least one receiver electrode mounted on the hull of said ship in electrical engagement with the water between and in spaced relation to the transmitter electrodes at a position which is on an imaginary line of symmetry through said transmitter electrodes and displaced from a center position between said transmitter electrodes by a substantial distance, means coupled to said transmitter electrodes for deriving a reference potential and electric signal measuring means coupled to said receiver electrode and reference means for measuring the signal at said receiver electrode with respect to said derived reference potential and including indicator means calibrated for said signal measurement to indicate proximity of such obstruction beneath said ship.

23. The combination as in claim 22 wherein said electrodes are at the bottom of said ship.

24. The combinations in claim 23 wherein said measuring means includes an indicator calibrated for said signal measurements to indicate depth of water below the level of said ship.

25. The combination as in claim 23 wherein said transmitter electrodes are respectively fore and aft of said ship at a centerline of said hull.

26. The combination as in claim 22 wherein said signal across said transmitter electrodes is an oscillatory signal, and said measuring means includes an amplifier coupled for amplifying said receiver electrode signal with respect to said reference potential, and a phase sensitive detector coupled for comparing said oscillatory signal to said amplified signal for improving the accuracy of said signal measurement on said indicator.

27. The combination as in claim 26 wherein said transmitting means includes a switching wave generator for effecting said oscillatory electrical potential signal.

28. In a ship mounted apparatus for sensing direction and proximity of massive underwater obstructions to movement of said ship through the water to facilitate guidance of said ship in manner to avoid contact with any of said obstructions, the combination of a pair of transmitter electrodes mounted fore and aft on the hull of said ship in spaced relation to each other in electrical engagement with said water, means for applying an electrical potential signal across said transmitter electrodes, a pair of receiver electrodes separate from said transmitter electrodes mounted in transverse relation to said transmitter electrodes on the hull of said ship in electrical engagement with the water and on respective sides of an imaginary line of symmetry through said transmitter electrodes, each of said receiver electrodes being substantially closer to one of said transmitter electrodes than the other of said transmitter electrodes and in spaced relation to the transmitter electrodes, and electric signal measuring means coupled to said receiver electrode pair for measuring the signal across said receiver electrodes, said measuring means including indicator means calibrated for indication of side and proximity of said ship to such massive barrier.

29. The combination as in claim 28 wherein said electrodes are at the bottom of said hull with said transmitter electrodes being respectively fore and aft of said ship along a centerline of said hull, and said receiver electrodes are in transverse relation to said transmitter electrodes on respective sides of said centerline.

30. The combination as in claim 29 wherein said measuring means includes an indicator calibrated for a center of channel indication for massive channel barriers symmetrically located on respective sides of said ship and corresponding off center channel indication as said ship is disposed nearer to a corresponding one of said channel barriers.

31. The combination as in claim 30 wherein said electric signal potential across said transmitter electrodes is an oscillatory electrical signal potential, and said measuring means includes a differential amplifier coupled for amplifying the signal differential across said receiver electrode pair.

32. The combination as in claim 31 wherein said measuring means additionally includes a phase sensitive detector coupled for comparing said amplified signal from said amplifier and said oscillatory signal from said transmitter electrode applying means for improving accuracy of said receiver electrode signal measurement.

33. The combination as in claim 32 wherein said means for applying an electrical potential signal across said transmitter electrodes includes a switching wave generator for effecting said applied oscillatory electrical potential signal.

34. The combination as in claim 33 wherein said switching wave generator is a Royer oscillator.

35. The combination as in claim 31 having additionally means coupled to said transmitter electrodes for providing a reference potential signal; and said measuring means includes means for obtaining a receiver electrical potential signal intermediate the signal potentials between said pair of receiver electrodes, means for measuring said intermediate signal with respect to said reference, and an indicator calibrated for said measurement to indicate depth of water beneath said ship.

36. The combination as in claim 28 wherein a second pair of receiver electrodes are mounted on said hull in electrical engagement with the water and in parallel relation to said transmitter electrodes, and said measuring means includes an indicator calibrated for signal measurements across said second receiver electrode pair to indicate proximity of such obstructions disposed below the level of said ship.

37. The combination as in claim 36 wherein said electrodes are at the bottom of said hull with said pair of transmitter electrodes and said second receiver electrode pair being along a centerline of said hull.

38. The combination as in claim 37 wherein said electric signal potential across said transmitter electrodes is an oscillatory electrical signal potential, and said measuring means has additionally means coupled to said transmitter and receiver electrodes for modifying the electrical signal potential across said receiver electrode pair to facilitate correlation of said receiver electrode signals for said indication of proximity of such obstructions.

39. The combination as in claim 38 having additionally another pair of receiver electrodes at the bottom of said hull in transverse relation to said transmitter electrodes and an indicator arranged for operation with said transverse electrodes and calibrated for causing the signal across said pair of transverse electrodes to indicate proximity of such obstruction in lateral relation to said ship.

40. In a ship mounted apparatus for indicating ship travel direction for optimum underwater channel clearance for said ship when in a water containing channel having sides forming massive barriers to movement of said ship in the direction of either of said sides, the combination of means on said ship including spaced apart forward and rearward transmitter positions for transmitting electric current through the water between the ship and each of the channel sides, means on said ship for measuring the potential difference between at least two positions in spaced relation to each other with each of said measuring positions being in the path of said current flow in said water at a corresponding one of said sides, said measuring positions being substantially closer to one of said forward and rearward transmitter positions than to the other of said forward and rearward transmitter positions and in transverse relation to said transmitter positions and indicator means coupled to said measuring means, said indicator means indicating said measurement in terms of said travel direction for optimum underwater channel clearance for said ship.

41. The combination as in claim 40 wherein said ship has an elongated hull for normal ship travel in the elongated direction of said hull, said current flow through the water is between at least one pair of transmitter electrodes at said forward and rearward positions forming part of said transmitting means, said transmitter electrodes being in spaced relation to each other in said elongated direction and fixed to said hull for electrical engagement with said water, and said measuring means includes at least one pair of receiver electrodes with one of said receiver electrodes for electrical engagement with the water at one of said two positions and the other of said receiver electrodes for electrical engagement with the water at the other of said two positions.

42. The combination as in claim 41 wherein said hull is substantially symmetrical on each side of an imaginary centerline running longitudinally at the bottom of said hull, said transmitter electrodes are fixed to said hull in said forward and rearward positions for substantially symmetrical current conduction through said water on respective sides of said centerline when said water is free of obstructions, and said receiver electrodes are fixed to said hull below the water level on respective sides of said centerline.

43. The combination as in claim 42 wherein said current flow is oscillatory current flow from and alternating wave generating means which is coupled across said transmitter electrodes and forms part of said transmitting means, and said measuring means includes an amplifier and phase sensitive detector, the amplifier having an input coupled across said receiver electrodes and an output coupled to the phase sensitive detector for comparing the amplified potential difference from said receiver electrodes to a potential difference derived from the transmitting means current flow to improve accuracy of said measuring means.

44. The combination as in claim 43 wherein said pair of receiver electrodes are fixed in perpendicular relation to said transmitter electrodes for movement with said ship at all times in the same relative position with respect to each other and said ship hull.

45. In combination, a channel having longitudinally thereof sides forming massive barriers to movement of a ship in the direction of either of said sides, water in said channel, a ship in said channel floating in said water and having a hull with a longitudinal axis, transmitting means on said ship for transmitting electric current through said water about said ship from one position on said axis to another position on said axis, means on said ship for measuring the potential difference from said current flow at two positions in said water with each position being on a respective side of said axis and substantially closer to said one than said other transmitter positions on said axis, and indicator means coupled to said measuring means for indicating said measurement in terms of ship travel direction for optimum channel clearance for said ship.

46. In an apparatus for sensing material obstructions in a water medium the combination of a pair of transmitter electrodes in spaced relation to each other in electrical engagement with said water medium, means for applying an oscillatory electrical potential signal across said transmitter electrodes, at least one receiver electrode in electrical engagement with the water medium between and in line with the transmitter electrodes at a position which is displaced from a center position between said transmitter electrodes by a distance equal to between one fifth and one tenth said transmitter electrode spacing, carrier means rigidly fixing said electrodes in place for movement in said medium with said electrodes carried in the same relative positions with respect to each other, and electric signal measuring means coupled to the receiver electrode for measuring said signal at said receiver electrode, said measuring means including a circuit coupled to said transmitter electrodes for providing an electric reference signal for measurement of said receiver electrode signal, said last mentioned circuit including a pair of receiver electrodes with each of said pair fixed close to a corresponding one of said transmitter electrodes for providing the coupling thereto.

47. In an apparatus for sensing material obstructions in a water medium the combination of a pair of transmitter electrodes in spaced relation to each other in electrical engagement with said water medium, means for applying an oscillatory electrical potential signal across said transmitter electrodes, a first receiver electrode in electrical engagement with the water medium between and in line with the transmitter electrodes at a position which is displaced from a center position between said transmitter electrodes, a second receiver electrode in electrical engagement with the water medium in line with the transmitter electrodes and displaced from said center position between said transmitter electrodes by the same distance as said first mentioned receiver electrode and on the opposite side of said center position from that of said first receiver electrode, said receiver electrodes being separated by a distance equal to about one tenth to one fifth the distance between said transmitter electrodes, and electric signal measuring means coupled to both said receiver electrodes, said measuring means including a signal balancing circuit coupled to said signal applying means and receiver electrodes for providing an electric bridge balance for said receiver electrode signal, said balancing circuit including a voltage divider resistor and potentiometer resistor, means coupling said voltage divider resistor and potentiometer resistor in parallel across said transmitter electrodes, a centertap on the voltage divider resistor, an adjustable wiper on the potentiometer resistor, a balancing transformer having a primary coupled to said centertap and adjustable wiper and a secondary coupled in series with one of said displaced receiver electrodes.

48. In a ship mounted apparatus for sensing massive underwater obstructions to movement of said ship through the water to facilitate guidance of said ship in manner to avoid contact with any of said obstructions, the combination of a pair of transmitter electrodes mounted in spaced relation to each other fore and aft of said ship along a centerline of the hull at the bottom of said ship and in electrical engagement with said water, means for applying an oscillatory electrical signal potential across said transmitter electrodes, a pair of receiver electrodes separate from said transmitter electrodes mounted on the hull of said ship in transverse relation to said transmitter electrodes on respective sides of said centerline, means coupled to said transmitter electrodes for providing a reference potential signal; and electric signal measuring means coupled to said receiver electrode pair for measuring the signal across said receiver electrodes, said measuring means including a differential amplifier coupled for amplifying the signal differential across said receiver electrode pair, an indicator calibrated for a center of channel indication for massive channel barriers symmetrically located on respective sides of said ship and corresponding off center channel indication as said ship is disposed nearer to a corresponding one of said channel barriers, means for obtaining a receiver electrical potential signal intermediate the signal potentials between said pair of receiver electrodes, means for measuring said intermediate signal with respect to said reference, and an indicator calibrated for said last mentioned measurement to indicate depth of water beneath said ship.

49. In a ship mounted apparatus for sensing massive underwater obstructions to movement of said ship through the water to facilitate guidance of said ship in manner to avoid contact with any of said obstructions, the combination of a pair of transmitter electrodes mounted in spaced relation to each other along a centerline of the hull at the bottom of said ship and in electrical engagement with said water, means for applying an oscillatory electrical signal potential across said transmitter electrodes, a pair of receiver electrodes separate from said transmitter electrodes mounted at the bottom of said hull along said centerline in electrical engagement with the water and in spaced relation to said transmitter electrodes, and electric signal measuring means coupled to said receiver electrode pair for measuring the signal across said receiver electrodes, said measuring means including an indicator calibrated for said signal measurements across said receiver electrode pair to indicate proximity of such obstruction disposed below the level of said ship and means coupled to said transmitter and receiver electrodes for modifying the electrical signal potential from across said receiver electrode pair to facilitate correlation of said receiver electrode signals for said indication of proximity of such obstructions.

50. The combination as in claim 49 wherein said measuring means includes a differential amplifier coupled to said receiver electrodes for amplifying said modified signal potential across said receiver electrode pair, and a phase sensitive detector coupled for comparing the amplified signal from said amplifier and said oscillatory signal from said applying means for improving accuracy of said receiver electrode signal measurement.

UNITED STATES PATENT OFFICE
CERTIFICATE OF CORRECTION

Patent No. 3,562,633          Dated Feb. 9, 1971

Inventor(s) William H. Swain

It is certified that error appears in the above-identified patent and that said Letters Patent are hereby corrected as shown below:

On the front page, in line 9 of the upper left hand column name of the assignee of a fractional part interest appeari as "William J. Kreske" should be -- Walter J. Kreske --.

Column 11, line 10, the term "peration" should be -- opera

Signed and sealed this 19th day of October 1971.

(SEAL)
Attest:

EDWARD M. FLETCHER, JR.          ROBERT GOTTSCHALK
Attesting Officer                Acting Commissioner of P